United States Patent [19]
Wen

[11] Patent Number: 5,666,736
[45] Date of Patent: Sep. 16, 1997

[54] SELF-ADJUSTING LEVEL FOR DETERMINING LEVELING BETWEEN TWO DISTANT POINTS

[76] Inventor: Cheng-Kan Wen, No. 35, Alley 304, Sec. 1., Kienkwo South Rd., Taipei, Taiwan

[21] Appl. No.: 542,694

[22] Filed: Oct. 13, 1995

[51] Int. Cl.⁶ .................................................. G01C 5/02
[52] U.S. Cl. ........................... 33/291; 33/391; 33/275 R
[58] Field of Search ........................... 33/227, 230, 275 R, 33/275 G, 291, 318, 324, 348, 374, 391, 397

[56] References Cited

U.S. PATENT DOCUMENTS

| | | | |
|---|---|---|---|
| 732,258 | 6/1903 | Belyeu | 33/291 |
| 784,511 | 3/1905 | Belyeu | 33/291 |
| 925,058 | 6/1909 | Wain | 33/291 |
| 1,278,575 | 9/1918 | Berg | 33/291 |
| 1,820,187 | 8/1931 | Gaynor | 33/290 |
| 2,571,287 | 10/1951 | Peters | 33/291 |
| 3,857,639 | 12/1974 | Mason | 33/290 |

*Primary Examiner*—G. Bradley Bennett
*Attorney, Agent, or Firm*—W. Wayne Liauh

[57] ABSTRACT

A self-adjusting level for determining the leveling between two distant points is disclosed. It mainly contains a main body and a light beam indicator. The main body contains a flame having two oppositely disposed supporting arms, a disc-like base disposed below said main body, and a 360-degree rotatable graduated angle-measuring disc disposed between said base and said frame. The light beam indicator includes: (a) an outer ring rotatably connected to and between said two supporting arms of said frame of said main body via two outer ring shafts so that said outer ring is allowed to freely rotate about said outer ring shafts, (b) an inner shaft being rotatably connected at both ends thereof to said outer ring and extending along a diameter of said outer ring so as to rotate in a direction normal to a rotating direction of said outer ring, (c) at least one light beam generator disposed inside said inner shaft for generating at least one light beam which emits from at least one end of said inner shaft, and (d) a plummet hanging from a central recess formed on said inner shaft. The plummet is provided with a battery means in an internal portion thereof to supply power to said light beam generator without affecting a motion of either of said inner shaft or said outer ring.

1 Claim, 4 Drawing Sheets

SELF-ADJUSTING LEVEL FOR DETERMINING LEVELING BETWEEN TWO DISTANT POINTS

BACKGROUND OF THE INVENTION

Accurate leveling is one of the most important procedures in many civil engineering works and machinery installations, such as the selection of ground level surface, the mounting of templates, the building of brick walls, the paving of tiles, the building of interior partitions, the mounting of ceiling boards, and the installation of large-dimension machine tools, cranes, automatic conveyors, etc. Accurate leveling is an important basis to secure good quality and safety in many engineering works.

Conventionally, the principle of using a floating air bubble is applied to the leveling. A round tubular leveling means is used to find a leveled surface by visually determining whether an air bubble in the tubular leveling means is at a balanced position. Or, in an even simpler manner as shown in FIG. 1, a hose filled with water can be utilized to achieve such purpose by holding two ends thereof until the water surfaces at two ends of the hose reach the same level. There are many shortcomings existed in the above-described conventional leveling methods, such as:

1. The hose method can not be used to measure the level of two distantly spaced points and therefore has limited function. The leveling by visually determining the balanced position of an air bubble in a tubular leveling means is not always accurate.
2. To calibrate or adjust the position of the level itself, several adjusting screws attached thereto must be rotated to correct the inclination of the level itself until the air bubble in the level is visually determined to be at a balanced position. A user would usually require a substantial amount of time to complete this correction or adjustment procedure by finely turning the adjusting screws, one by one, while no one can assure a satisfactory result will be obtained. This procedure greatly and adversely affects the efficiency of the leveling.

SUMMARY OF THE INVENTION

It is therefore a primary object of the present invention to develop a self-adjusting leveling instrument which provides more accurate measuring results and can be more easily operated without being limited by the distance between the points to be measured.

The leveling instrument according to the present invention includes a main body disposed on a base. On the main body, a rotatable inner shaft and a rotatable outer ring forming a circumscribed circle of the inner shaft are rotatably mounted so that they may freely and separately rotate in two orthogonal directions while a plummet hanging from the center of the inner shaft freely swings under the effect of gravity. That is, the leveling instrument will always be automatically adjusted to be in a leveled position. At least one light beam generator is disposed in the rotatable inner shaft to emit well-focused light beam which has satisfactory indicating ability even at a long distance. The main body of the instrument is 360-degree rotatably mounted on the base so that a user may quickly and accurately adjust the instrument for use in any direction in a leveled position. The self-adjusting leveling instrument of the present invention can therefore be conveniently operated by one single person without affecting the accuracy and efficiency thereof.

DETAILED DESCRIPTION OF THE PREFERRED EMBODIMENTS

Figure 1:
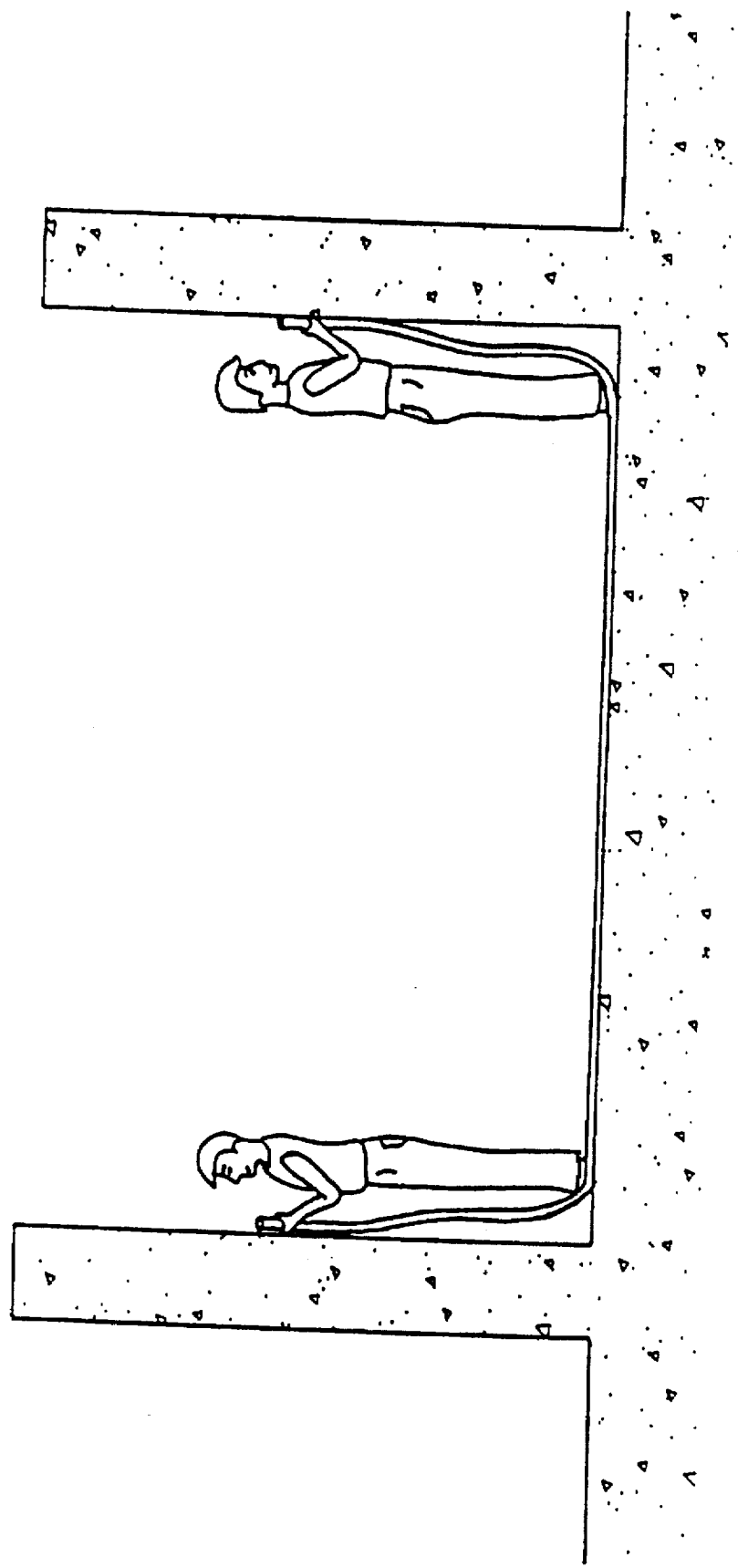
FIG. 1 illustrates the conventional manner of measuring the correct leveling between two distant points by means of a hose.
Figure 2:
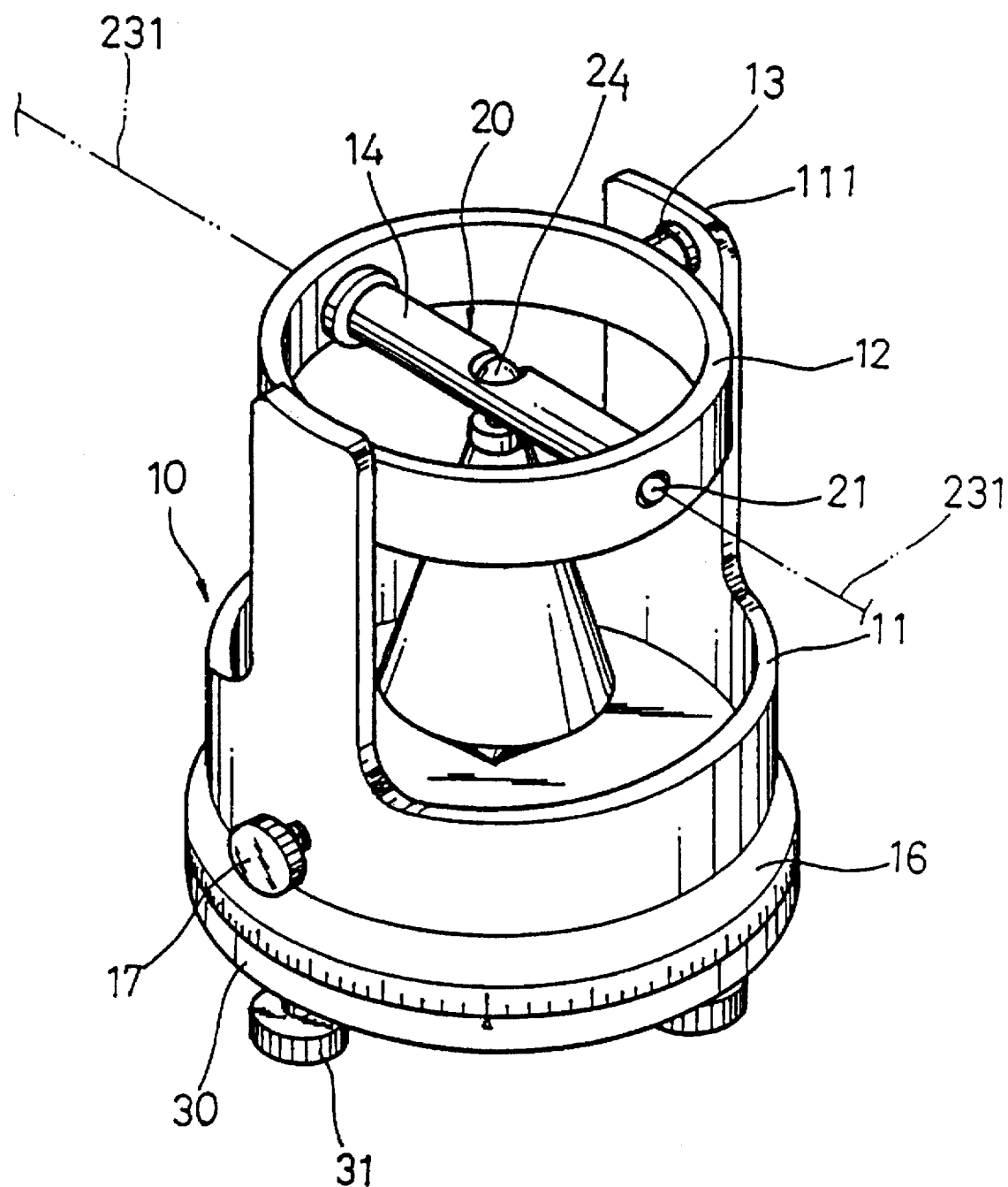
FIG. 2 is a perspective view showing an embodiment of the present invention.
Figure 3:
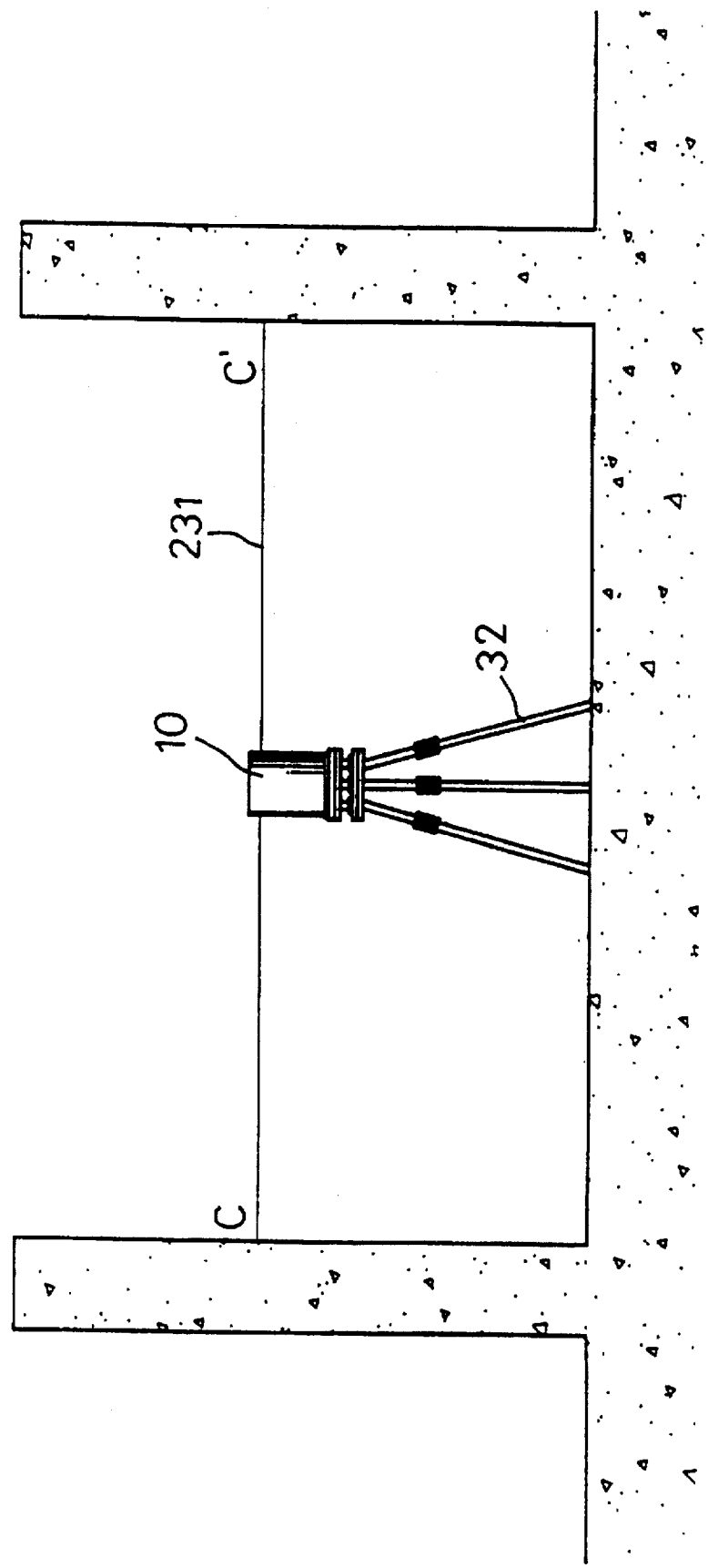
FIG. 3 illustrates the manner in which the present invention is used to measure the correct leveling between two distant points.

Please refer to FIG. 2 in which a perspective view of a self-adjusting level according to the present invention is shown. The self-adjusting level of the present invention includes a main body 10 and a light beam indicator 20.

The main body 10 further includes a frame having two oppositely disposed supporting arms 111, a disc-like base 30 below the main body 10, and a 360-degree rotatable graduated angle disc 16 disposed between the base 30 and frame 11. A number of adjusting screws 31 are provided on the bottom side of the base 30 so that the base 30 may be stably positioned on a ground or some other plane for use. A tripod 32 is removably connected to the bottom side of the base 30 to support the level of the present invention.

Figure 4:
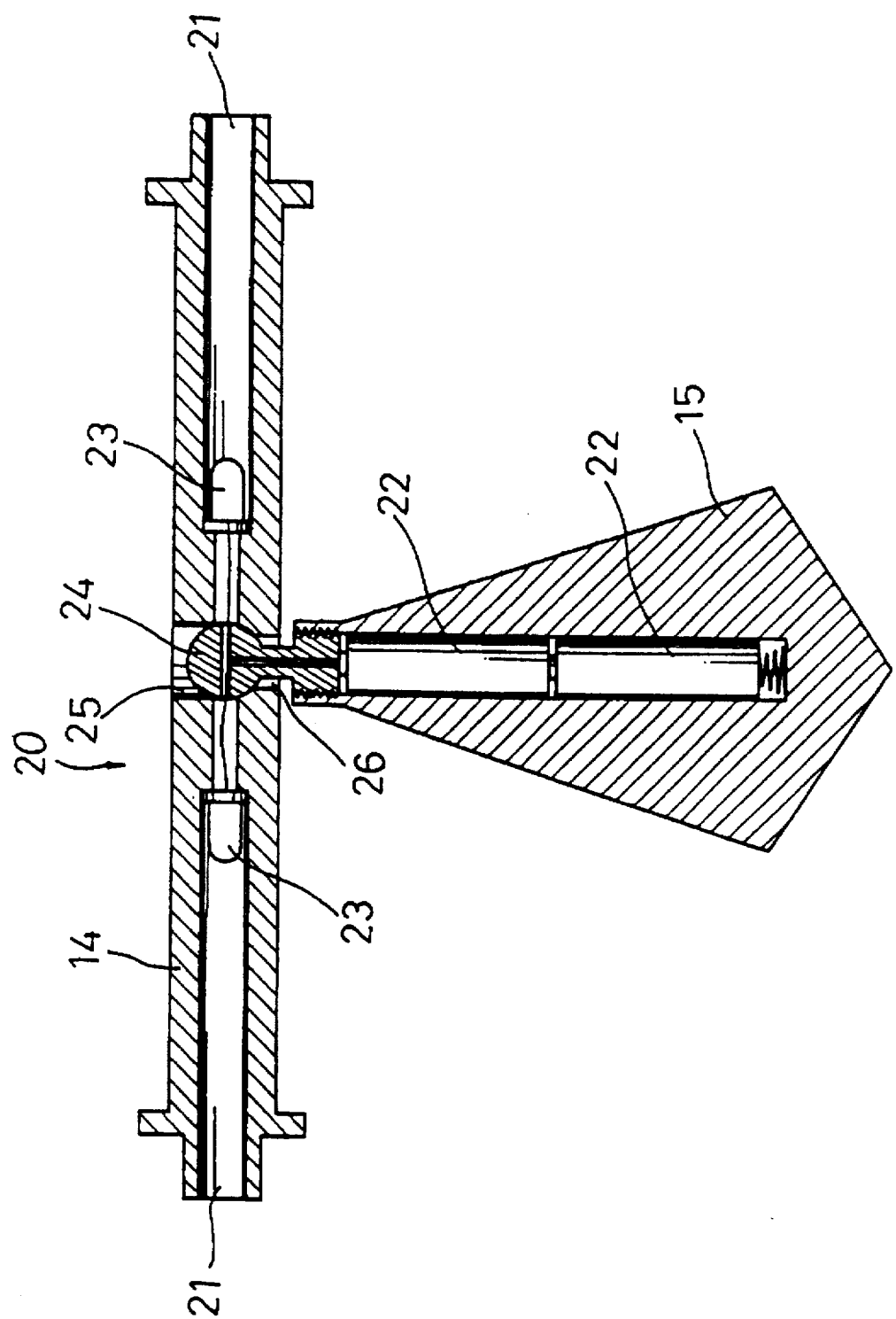
FIG. 4 is a fragmentary, enlarged, sectional view showing the light beam indicator and the plummet of the present invention.

The light beam indicator 20 includes a rotatable inner shaft 14 having two light emitting openings 21 respectively provided at both ends thereof, and one or two light beam generators 23 disposed inside the rotatable inner shaft 14, as shown in FIG. 4. The rotatable inner shaft 14 is freely and rotatably connected at two ends thereof to a rotatable outer ring 12 so that it extends through a center of the rotatable outer ring 12. The rotatable outer ring 12 is fixedly connected to and between two outer ring shafts 13 which are respectively rotatably connected to the two supporting arms and is thereby allowed to vertically turn about the outer ring shafts 13. The rotatable inner shaft 14 extends in a direction just normal to a virtual axis of the two outer ring shafts 13 so that the rotatable inner shaft 14 rotates in a direction normal to direction in which the rotatable outer ring 12 rotates.

A plummet 15 is connected to the rotatable inner shaft 14 and freely hangs therefrom. With the freely rotatable inner shaft 14 and outer ring 12, the plummet 15 is allowed to swing freely in any direction under the effect of gravity during the process of leveling.

FIG. 5 illustrates the use of a self-adjusting level of the present invention in leveling. The main body 10 of the level is mounted on the tripod 32. Light beams 231 are emitted toward two sides via the two end opening 21 of the rotatable inner shaft 14 mounted on the main body 10.

Please refer to FIG. 4 which is a sectional view showing the light beam indicator 20 and the plummet 15 of the present invention. The plummet 15 is provided thereinside with a pair of batteries 22 for supplying power to the light beam generators 23 for the latter to emit light beams. The plummet 15 has a head portion being provided with female threads. A bulb-like member 24 is disposed in a recess 25 formed at a center of the rotatable inner shaft 14. The recess 25 forms a cylindrical space having a lower portion 26 which is also a cylindrical space but having a reduced diameter smaller than the diameter of the bulb-like member 24, so that the member 24 is supported on the lower portion 26 and is allowed to freely rotate or swing in the recess 25. The bulb-like member 24 further has a projected lower end having an outer surface provided with male threads which are engaged with the female threads provided on the head portion of the plummet 15. In this manner, the plummet 15 is attached to the rotatable inner shaft 14 and hangs therefrom.

The one or two light beam generators 23 can be any currently market available conventional products for such purpose. Light beam or beams 231 are generated by the light beam generator or generators 23 via focusing lens thereof and is or are emitted through the end openings 21 of the rotatable inner shaft 14 along an axis of the shaft 14.

What is claimed is:

1. A self-adjusting level for determining the leveling between two distant points, comprising:

a main body and a light beam indicator, said main body further including a frame having two oppositely disposed supporting arms, a disc-like base disposed below said main body, and a 360-degree rotatable graduated angle-measuring disc disposed between said base and said frame, said light beam indicator including: (a) an outer ring rotatably connected to and between said two supporting arms of said frame of said main body via two outer ring shafts so that said outer ring is allowed to freely rotate about said outer ring shafts, (b) an inner shaft being rotatably connected at both ends thereof to said outer ring and extending along a diameter of said outer ring so as to rotate in a direction normal to a rotating direction of said outer ring, (c) at least one light beam generator disposed inside said inner shaft for generating at least one light beam which emits from at least one end of said inner shaft, and (d) a plummet hanging from a central recess formed on said inner shark, wherein said plummet is provided with a battery means in an internal portion thereof to supply power to said light beam generator without affecting a motion of either of said inner shaft or said outer ring.

* * * * *